US012792920B2

(12) United States Patent
Xu et al.

(10) Patent No.: US 12,792,920 B2
(45) Date of Patent: Nov. 10, 2026

(54) MULTI-MODAL NEURAL NETWORK ARCHITECTURE SEARCH

(71) Applicant: Google LLC, Mountain View, CA (US)

(72) Inventors: Zhen Xu, Mountain View, CA (US); David Richard So, San Francisco, CA (US); Andrew M. Dai, San Francisco, CA (US)

(73) Assignee: Google LLC, Mountain View, CA (US)

(*) Notice: Subject to any disclaimer, the term of this patent is extended or adjusted under 35 U.S.C. 154(b) by 1031 days.

(21) Appl. No.: 17/915,796

(22) PCT Filed: Mar. 30, 2021

(86) PCT No.: PCT/US2021/024885
§ 371 (c)(1),
(2) Date: Sep. 29, 2022

(87) PCT Pub. No.: WO2021/202528
PCT Pub. Date: Oct. 7, 2021

(65) Prior Publication Data

US 2023/0274151 A1 Aug. 31, 2023

Related U.S. Application Data

(60) Provisional application No. 63/002,192, filed on Mar. 30, 2020.

(51) Int. Cl.
*G06N 3/04* (2023.01)
*G06N 3/045* (2023.01)
*G06N 3/086* (2023.01)

(52) U.S. Cl.
CPC ............ *G06N 3/086* (2013.01); *G06N 3/045* (2023.01)

(58) Field of Classification Search
CPC .............................. G06N 3/086; G06N 3/082
See application file for complete search history.

(56) References Cited

U.S. PATENT DOCUMENTS

2020/0143243 A1* 5/2020 Liang .................... G06N 3/045

FOREIGN PATENT DOCUMENTS

WO WO 2018213841 11/2018
WO WO 2019081705 5/2019

OTHER PUBLICATIONS

Rúa et al ("MFAS: Multimodal Fusion Architecture Search" Mar. 2019) (Year: 2019).*
So et al ("The Evolved Transformer" 2019) (Year: 2019).*
Xue et al ("AWDF: An Adaptive Weighted Deep Fusion Architecture for Multi-modality Learning" 2019) (Year: 2019).*
Aczon et al., "Dynamic mortality risk predictions in pediatric critical care using recurrent neural networks" CoRR, Submitted on Jan. 2017, arXiv:1701.06675v1, 18 pages.
Adler-Milstein et al., "Electronic health record adoption in US hospitals: progress continues, but challenges persist" Health affairs 34 (12), Dec. 2015, 2174-2180.

(Continued)

*Primary Examiner* — Lut Wong
(74) *Attorney, Agent, or Firm* — Fish & Richardson P.C.

(57) ABSTRACT

Methods, systems, and apparatus, including computer programs encoded on computer storage media, for searching for an architecture for a neural network that performs a multi-modal task that requires operating on inputs that each include data from multiple different modalities.

21 Claims, 4 Drawing Sheets

(56) References Cited

OTHER PUBLICATIONS

Angeline et al., "An evolutionary algorithm that constructs recurrent neural networks" IEEE transactions on Neural Networks, Jan. 1996, 27 pages.
Baker et al., "Designing Neural Network Architectures using Reinforcement Learning" CoRR, Submitted on Mar. 2017, arXiv:1611.02167v3, 18 pages.
Baltrušaitis et al., "Multimodal Machine Learning: A Survey and Taxonomy" CoRR, Submitted on Aug. 2017, arXiv:1705.9406v2, 20 pages.
Bates et al., "Big data in health care: using analytics to identify and manage high-risk and high-cost patients" Health Affairs 33(7), Jul. 2014, 1123-1131.
Bender et al., "Understanding and Simplifying One-Shot Architecture Search" In Proceedings of the 35th International Conference on Machine Learning, PMLR, Jul. 2018, 10 pages.
Bergstra et al., "Random search for hyper-parameter optimization" Journal of machine learning research 13.2, Feb. 2012, 281-305.
Brock et al., "SMASH: One-Shot Model Architecture Search through HyperNetworks" CoRR, Submitted on Aug. 2017, arXiv:1708.05344v1, 21 pages.
Cai et al., "Proxylessnas: Direct neural architecture search on target task and hardware" CoRR, Submitted on Feb. 2019, arXiv:1812.00332v2, 13 pages.
Che et al., "Recurrent neural networks for multivariate time series with missing values" Scientific reports 8(1):6085, Apr. 2018, 12 pages.
Cheng et al., "Risk prediction with electronic health records: A deep learning approach." In Proceedings of the 2016 SIAM International Conference on Data Mining. SIAM, Jun. 2016, 432-440.
Choi et al., "Doctor ai: Predicting clinical events via recurrent neural networks" In Proceedings of Machine Learning for Healthcare, Dec 2016, 18 pages.
Choi et al., "Graph convolutional transformer: Learning the graphical structure of electronic health records" CoRR, Submitted on Jun. 2019, arXiv:1906.04716v2, 17 pages.
Choi et al., "Mime: Multilevel medical embedding of electronic health records for predictive healthcare" In Advances in neural information processing systems, 2018, 11 pages.
Dauphin et al., "Language modeling with gated convolutional networks" In Proceedings of the 34th International Conference on Machine Learning—vol. 70, Jul. 2017, 9 pages.
Dehghani et al., "Universal Transformers" CoRR, Submitted on Jul. 2018, arXiv:1807.03819v1, 19 pages.
Desautels et al., "Parallelizing exploration-exploitation tradeoffs in gaussian process bandit optimization" Journal of Machine Learning Research 15, 2014, 4053-4103.
Devlin et al., "Bert: Pre-training of deep bidirectional transformers for language understanding" CoRR, Submitted on May 2019, arXiv:1810.04805v2, 16 pages.
D'mello et al., "A review and meta-analysis of multimodal affect detection systems." ACM computing surveys (CSUR) 47.3, Feb. 2015, 43:1-37.
Elfwing et al., "Sigmoid-Weighted Linear Units for Neural Network Function Approximation in Reinforcement Learning" CoRR, Submitted on Nov. 2017, arXiv:1702.03118v3, 18 pages.
Elixhauser et al., "Hospital inpatient statistics, 1995" Jan. 1999, 9 pages.
Elsken et al., "Efficient Multi-Objective Neural Architecture Search via Lamarckian Evolution" CoRR, Submitted on Feb. 2019, arXiv:1804.09081v4, 23 pages.
Fahlman et al., "The cascade-correlation learning architecture" Advance in Neural Information Processing Systems (2), 1989, 524-532.
Ghiasi et al., "Nas-fpn: Learning scalable feature pyramid architecture for object detection" Proceedings of the IEEE/CVF conference on computer vision and pattern recognition, 2019, 7036-7045.
Hou et al., "Deep Multimodal Multilinear Fusion with High-order Polynomial Pooling" In Advances in Neural Information Processing Systems, 2019, 10 pages.
International Preliminary Report on Patentability in International Appln. No. PCT/US2021/024885, mailed on Oct. 12, 2022, 13 pages.
International Search Report and Written Opinion in International Appln. No. PCT/US2021/024885, mailed on Jul. 22, 2021, 20 pages.
Johnson et al., "MIMIC-III, a freely accessible critical care database" Scientific data 3(1), May 2016, 9 pages.
Kahou et al., "Emonets: Multimodal deep learning approaches for emotion recognition in video" CoRR, Submitted on Mar. 2015, arXiv:1503.01800v2, 14 pages.
Kingma et al., "Adam: A method for stochastic optimization" CoRR, Submitted on Jan. 2017, arXiv:1412.6980v9, 15 pages.
Krumholz et al., "Big data and new knowledge in medicine: the thinking, training, and tools needed for a learning health system" Health Affairs 33 (7), Jul. 2014, 1163-1170.
Li et al., "BEHRT: Transformer for Electronic Health Records" CoRR, Submitted on Jul. 2019, arXiv:1907.09538v1, 17 pages.
Liang et al., "Strong and simple baselines for multimodal utterance embeddings" CoRR, Submitted on May 2019, arXiv:1906.02125v1, 11 pages.
Lipton et al., "Learning to diagnose with LSTM recurrent neural networks" CoRR, Submitted on Mar. 2017, arXiv:1511.03677v7, 18 pages.
Liu et al., "Auto-deeplab: Hierarchical neural architecture search for semantic image segmentation" Proceedings of the IEEE/CVF conference on computer vision and pattern recognition, 2019, 82-92.
Liu et al., "Darts: Differentiable architecture search" CoRR, Submitted on Apr. 2019, arXiv:1806.09055v2, 13 pages.
Liu et al., "Progressive neural architecture search." Proceedings of the European conference on computer vision (ECCV), 2018, 16 pages.
Maas et al., "Rectifier nonlinearities improve neural network acoustic models" In Proc icml, vol. 30. Jun. 3, 2013, 6 pages.
Mandel et al., "SMART on FHIR: a standards-based, interoperable apps platform for electronic health records." Journal of the American Medical Informatics Association 23.5, Sep. 2016, 899-908.
Mendoza et al., "Towards automatically-tuned neural networks" In Workshop on Automatic Machine Learning 64, 2016, 58-65.
Miotto et al., "Deep patient: an unsupervised representation to predict the future of patients from the electronic health records" Scientific reports 6 (1), May 2016, 10 pages.
Morvant et al., "Majority vote of diverse classifiers for late fusion" CoRR, Submitted on Jun. 2014, arXiv:1404.7796v2, 10 pages.
Mroueh et al., "Deep multimodal learning for audio-visual speech recognition" CoRR, Submitted on Jan. 2015, arXiv:1501.05396v1, 8 pages.
Ngiam et al., "Multimodal deep learning." Proceedings of the 28th international conference on machine learning (ICML-11), 2011, 689-696.
Nguyen et al., "Deepr: a convolutional net for medical records" CoRR, Submitted on Jul. 2016, arXiv:1607.07519v1, 9 pages.
Parikh et al., "Integrating predictive analytics into high-value care: the dawn of precision delivery" Jama 315 (7), Feb. 2016, 651-652.
Perez-Rua et al., "MFAS: Multimodal Fusion Architecture Search," Proceedings of the IEEE/CVF Conference on Computer Vision and Pattern Recognition (CVPR), Mar. 2019, 6966-6975.
Pham et al., "Deepcare: A deep dynamic memory model for predictive medicine" CoRR, Submitted on Apr. 2017, arXiv:1602.00357v2, 27 pages.
Pham et al., "Efficient neural architecture search via parameters sharing" International conference on machine learning. PMLR, Jul. 2018, 10 pages.
Pollard et al., "The eICU Collaborative Research Database, a freely available multi-center database for critical care research" Scientific data, Sep. 5, 2018, 13 pages.
Rajagopalan et al., "Extending long short-term memory for multi-view structured learning" In European Conference on Computer Vision. Springer, 2016, 338-353.

(56) References Cited

OTHER PUBLICATIONS

Rajkomar et al., "Scalable and accurate deep learning with electronic health records." NPJ digital medicine 1.1:18, May 2018, 10 pages.
Ramachandran et al., "Searching for activation functions" Submitted on Oct. 2017, arXiv:1710.05941v2, 13 pages.
Razavian et al., "Multi-task prediction of disease onsets from longitudinal laboratory tests" In Machine Learning for Healthcare Conference, Dec 2016, 27 pages.
Real et al., "Large-scale evolution of image classifiers" In Proceedings of the 34th International Conference on Machine Learning, Jul. 2017, 10 pages.
Real et al., "Regularized evolution for image classifier architecture search" In Proceedings of the aaai conference on artificial intelligence, vol. 33 (1), Jul. 2019, 4780-4789.
Shang et al., "Pre-training of Graph Augmented Transformers for Medication Recommendation" CoRR, Submitted on Nov. 2019, arXiv:1906.00346v2, 8 pages.
Shickel et al., "Deep EHR: a survey of recent advances in deep learning techniques for electronic health record (EHR) analysis" IEEE journal of biomedical and health informatics 22.5, Sep. 2018, 45 pages.
Shutova et al., "Black holes and white rabbits: Metaphor identification with visual features" In Proceedings of the 2016 Conference of the North American Chapter of the Association for Computational Linguistics: Human Language Technologies, Jun. 2016, 160-170.
Siegelmann et al., "On the computational power of neural nets" Proceedings of the fifth annual workshop on Computational learning theory, Jul. 1992, 440-449.
Sifre et al., "Rigid-Motion Scattering For Texture Classification" CoRR, Submitted on Mar. 2014, arXiv:1403.1687v1, 19 pages.
Slee, "The International classification of diseases: ninth revision (ICD-9)" Annals of internal medicine 88 (3), Mar. 1978, 424-426.
So et al., "The Evolved Transformer" Proceedings of the 36th International Conference on Machine Learning, PMLR 97, 2019, 10 pages.
Socher et al., "Grounded compositional semantics for finding and describing images with sentences" Transactions of the Association for Computational Linguistics 2, Apr. 2014, 207-218.
Song et al., "Attend and diagnose: Clinical time series analysis using attention models." Proceedings of the AAAI conference on artificial intelligence. vol. 32. No. 1., Apr. 2018, 4091-4098.
Stanley et al., "Evolving neural networks through augmenting topologies." Evolutionary computation 10.2, Jun. 2002, 27 pages.
Suganuma et al., "A genetic programming approach to designing convolutional neural network architectures" CoRR, Submitted on Aug. 2017, arXiv:1704.00764v2, 9 pages.
Sun et al., "Evolving deep convolutional neural networks for image classification" CoRR, Submitted on Mar. 2019, arXiv:1710.10741v3, 13 pages.
Suresh et al., "Clinical intervention prediction and understanding using deep networks" CoRR, Submitted on May 2017, arXiv:1705.08498v1, 16 pages.
Tan et al., "EfficientNet: Rethinking Model Scaling for Convolutional Neural Networks" CoRR, Submitted on Nov. 2019, arXiv:1905.11946v3, 10 pages.
Tan et al., "MnasNet: Platform-Aware Neural Architecture Search for Mobile" CoRR, Submitted on Jul. 2018, arXiv:1807.11626v1, 9 pages.
Tran et al., "Learning vector representation of medical objects via EMR-driven nonnegative restricted Boltzmann machines (eNRBM)" Journal of biomedical informatics 54, Apr. 2015, 96-105.
Vaswani et al., "Tensor2tensor for neural machine translation" CoRR, Submitted on Mar. 2018, arXiv:1803.07416v1, 9 pages.
Vaswani, Ashish, et al. "Attention is all you need." Advances in neural information processing systems 30, 2017, 11 pages.
Wang et al., "Inpatient2Vec: Medical Representation Learning for Inpatients" CoRR, Submitted on Oct. 2019, arXiv:1904.08558v2, 8 pages.
Wu et al., "Pay less attention with lightweight and dynamic convolutions" CoRR, Submitted on Feb. 2019, arXiv:1901.10430v2, 14 pages.
Xie et al., Exploring randomly wired neural networks for image recognition. In Proceedings of the IEEE International Conference on Computer Vision, 2019, 1284-1293.
Xie et al., "Genetic cnn." Proceedings of the IEEE international conference on computer vision, 2017, 1379-1388.
Yang et al., "Xlnet: Generalized autoregressive pretraining for language understanding" In Advances in neural information processing systems, 2019, 11 pages.
Yao, "Evolving artificial neural networks" IEEE, Sep. 1999, 1423-1447.
Yin et al., "BM-Nas: Bilevel Multimodal Neural Architecture Search" CoRR, Submitted on Apr. 2021, arXiv:2104.09379v1, 14 pages.
Yu et al., "Deep Multimodal Neural Architecture search" CoRR, Submitted on Oct. 2020, arXiv:2004.12070v2, 10 pages.
Zoph et al., "Learning transferable architectures for scalable image recognition" In Proceedings of the IEEE conference on computer vision and pattern recognition, 2018, 8697-8710.
Zoph et al., "Neural architecture search with reinforcement learning" CoRR, Submitted on Feb. 2017, arXiv:1611.01578v2, 16 pages.

* cited by examiner

MULTI-MODAL NEURAL NETWORK ARCHITECTURE SEARCH

CROSS-REFERENCE TO RELATED APPLICATION

This application is a National Stage Application under 35 U.S.C. § 371 of International Application No. PCT/US2021/024885, filed on Mar. 30, 2021, which claims priority to U.S. Provisional Patent Application No. 63/002,192, filed Mar. 30, 2020, the entirety of which are herein incorporated by reference.

BACKGROUND

This specification relates to determining architectures for neural networks that receive multi-modal inputs.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines a network architecture for a neural network that is configured to perform a multi-modal machine learning task.

A multi-modal machine learning task is a task that requires the neural network to process an input that includes data from two or more modalities in order to generate the output for the task.

According to an implementation there is provided a method comprising: receiving training data for training a neural network to perform a multi-modal machine learning task, the training data comprising a plurality of training examples and a respective target output for each of the training examples, wherein each training example comprises a respective network input from each of a plurality of modalities; and determining, using the training data, an optimized neural network architecture for performing the machine learning task. The determining comprises generating a plurality of candidate neural network architectures. Each candidate neural network architecture comprises a plurality of operation blocks that each receive a respective block input comprising at least a respective first input hidden state and a respective second hidden state and apply one or more operations to the block input to generate an output hidden state. Generating each of the plurality of candidate neural network architectures comprises, for each of the operation blocks in the candidate neural network architecture: selecting, for each of the plurality of operation blocks, each of the first and second hidden states that are received as input by the operation block from a respective set of possible inputs that includes at least each of the respective network inputs from each of the plurality of modalities. For each candidate network architecture, a respective fitness on the multi-modal machine learning task is determined. The optimized neural network architecture is selected, from the candidate neural network architectures, based on the respective fitnesses. The method may include one or more of the following features. The plurality of operation blocks are ordered in a sequence, and wherein, for each of the operation blocks, the respective set of possible inputs includes each of the respective network inputs from each of the plurality of modalities and the block outputs of any of the operation blocks that are before the operation block in the sequence. Each candidate neural network architecture (i) generates an output state that is a combination of a respective output state for each of the plurality of modalities and (ii) processes at least the output state using one or more neural network layers to generate a final output for the multi-modal machine learning task, and the respective output state for each of the plurality of modalities is generated from output hidden states that are both (i) not used in a block input for any of the plurality of operation blocks and (ii) conditioned on the respective network input from the modality. The output state is a concatenation of the respective output states for each of the modalities. Determining the fitness comprises: training a new neural network having the candidate neural network architecture on a training subset of the training data; and determining the fitness by evaluating a performance of the trained new neural network on a validation subset of the training data. Each training example is data from an electronic health record and wherein the plurality of modalities comprise two or more of: contextual features, categorical features, continuous features, or clinical notes. Each training example is health data for a patient, and wherein the plurality of modalities includes one or more of: data of one or more modalities extracted from an electronic health record for the patient, medical image data for the patient, genomics data for the patient, or waveforms of speech or other audio data relevant to the patient. The multi-modal machine learning task is a task to predict an aspect of health of a patient from electronic health record data or health data for the patient. The plurality of modalities include audio data and corresponding video data and the multi-modal machine learning task is audio-video speech recognition or visual question-answering. The plurality of modalities include content data and one or more of meta data for the content data or history data associated with a user being presented the content data, and wherein the multi-modal machine learning task is content recommendation. Generating the plurality of candidate neural network architectures may comprise: maintaining population data comprising, for each candidate neural network architecture in a population of candidate neural network architectures, data defining the candidate neural network architecture and the fitness for the candidate neural network architecture, and repeatedly performing the following operations: selecting a candidate neural network architecture from the population, generating a new candidate neural network architecture by applying one or more mutations to the selected candidate neural network architecture having the best fitness, determining a fitness for the new candidate neural network architecture, and adding the new candidate neural network architecture to the population. The following operations may further comprise: selecting another plurality of candidate neural network architectures from the population, and removing from the population the candidate neural network architecture from the selected other plurality of candidate neural network architectures having a fitness that was determined least recently. Selecting, from the candidate neural network architectures, the optimized neural network architecture based on the respective fitnesses may comprise, after repeatedly performing the operations: selecting the optimized neural network architecture from the population based on the fitnesses of the candidate neural network architectures in the population. The selecting the optimized neural network architecture may comprise selecting the candidate neural network architecture in the population that has the best fitness. The selecting may comprise: selecting, from the population, a plurality of candidate neural network architectures having the highest fitnesses; training respective neural networks having each of the plurality of selected candidate neural network architectures; determining a respective fitness for each of the trained respective neural networks; and selecting, as the optimized neural network architecture, the candidate neural network architecture corresponding to the trained respective neural network having the best fitness.

Determining, for each candidate network architecture, a respective fitness on the multi-modal machine learning task may comprise: training a neural network having the candidate neural network architecture on at least a portion of the training data; and determining a fitness for the trained neural network based on a fitness measure for the multi-modal machine learning task. The method may further comprise providing data specifying the optimized architecture for use in performing the multi-modal machine learning task. The method may further comprise using a neural network having the optimized architecture to perform the multi-modal machine learning task on new examples. Generating each of the plurality of candidate neural network architectures may further comprise, for each of the operation blocks in the candidate neural network architecture: selecting respective values for each of one or more search fields that define the one or more operations that are applied by the operation block to the block input to the operation block. The selected optimized neural network architecture may be output for inference. For example, the selected optimized neural network architecture may be trained using the training data or using additional training data. The selected optimized neural network architecture may be used to perform the multi-modal machine learning task by inputting multi-modal data to the machine learning task and generating an output prediction based upon the input multi-modal data. The multi-modal input data and output prediction may take various forms as described in this specification.

Particular embodiments of the subject matter described in this specification can be implemented so as to realize one or more of the following advantages.

Existing neural architecture search techniques are developed for and target unimodal data sets and unimodal tasks. Because of this, existing techniques fail to determine high quality architectures for multi-modal tasks that require operating on multi-modal data. By determining the architecture of a neural network using the techniques described in this specification, however, the system can determine a network architecture that achieves or even exceeds state of the art performance on any of a variety of multi-modal machine learning tasks. In particular, the system can determine this architecture by jointly optimizing multimodal fusion and model architecture, resulting in architectures that outperform the state-of-the-art and, in some cases, that generalize to other data sets, other multi-modal tasks, or both.

In particular, the described techniques can be applied to neural network tasks that require operating on electronic health record (EHR) data. EHR data generally has a very complex multimodal structure. EHR usually contains a mixture of structured data (codes) and unstructured data (free-text) with sparse and irregular longitudinal features—all of which doctors or other medical professionals utilize when making decisions. In the deep learning regime, determining how different modality representations should be fused together is a difficult problem, which is often addressed by handcrafted modeling and intuition. The described techniques, however, simultaneously search across multimodal fusion strategies and modality-specific architectures. This results in architectures that outperform conventional, unimodal architecture search techniques and hand-crafted architectures on a variety of tasks that require processing EHR data. Moreover, the generated architectures generalize across multiple different tasks that all require operating on EHR data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
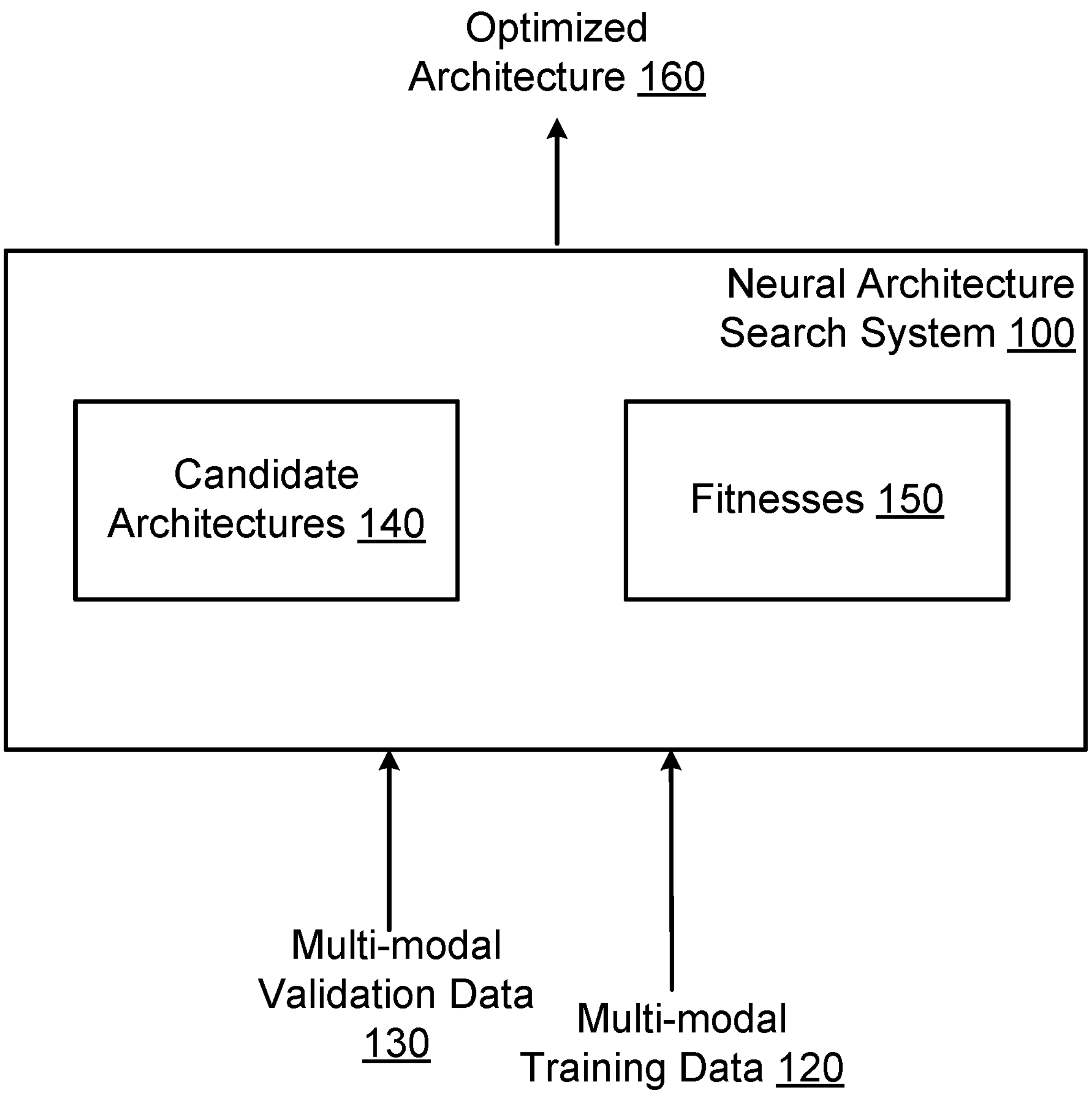
FIG. 1 shows an example neural architecture search system.

FIG. 1 shows an example neural architecture search system 100. The neural architecture search system 100 is an example of a system implemented as computer programs on one or more computers in one or more locations, in which the systems, components, and techniques described below can be implemented.

This system 100 determines a network architecture for a neural network that is configured to perform a multi-modal machine learning task.

A multi-modal machine learning task is a task that requires the neural network to process an input that includes data from two or more modalities in order to generate the output for the task.

As one example, the task can be a health-related task to generate output predictions about the health of a patient from multi-modal data relating to the patient, e.g., to generate output that predicts the likelihood of one or more health events occurring to the patient in some future time period, to predict a treatment that should be prescribed to the patient, or to predict a diagnosis for the patient.

The multiple modalities can include multiple different feature modalities from the electronic health record of the patient. In particular, the multiple different feature modalities can include two or more of: (1) contextual features, such as patient age and sex; (2) longitudinal categorical features, such as procedure codes, medication codes, and condition codes; (3) longitudinal continuous features, such as blood pressure, body temperature, and heart rate; and (4) longitudinal free-text clinical notes, which are often lengthy and contain a lot of medical terminology. In one example the multiple feature modalities can include one or more of: (1) contextual features, such as patient age and sex; (2) longitudinal categorical features, such as procedure codes, medication codes, and condition codes; and (3) longitudinal continuous features, such as blood pressure, body temperature, and heart rate; in combination with (4) longitudinal free-text clinical notes, which are often lengthy and contain a lot of medical terminology. In another example the multiple feature modalities can include two or more of: (1) contextual features, such as patient age and sex; (2) longitudinal categorical features, such as procedure codes, medication codes, and condition codes; and (3) longitudinal continuous features, such as blood pressure, body temperature, and heart rate.

These data types differ not only in feature spaces and dimensionalities, but also in data generation processes and measurement frequencies. For example, lab tests and procedures are ordered at the physician's discretion and therefore occur at irregular frequencies in the electronic health record, while blood pressure and body temperature can be monitored on a regular basis.

Instead of or in addition to one or more modalities from the electronic health record, the multiple modalities can also include any of: medical imaging data for the patient in which a medical image of the patient is input (for example pixel values of a medical image), genomics data for the patient, for example sequence data of DNA or RNA of the patient, or speech waveform or other audio waveform data that is relevant to the patient. As another example, the task can be a task that requires processing audio data of a person speaking and corresponding video. That is, one modality is audio data and the other data is the corresponding video data or images corresponding to frames of the video data, for example pixel values of frames of the video data. Examples of such tasks include audio-visual speech recognition in which output speech is predicted from input video data and visual question-answering in which an output answer is predicted from input video data.

As another example, the task can be a content recommendation task that requires processing data from multiple feature modalities to make a recommendation of one or more content items to be presented to a user. The feature modalities can include two or more of: content data characterizing the content item currently being presented to the user, meta data for the content data, or history data characterizing previous content items that have been previously presented to the user and, optionally, data characterizing the interaction of the user with the previously presented content items.

To determine the optimized architecture, the system 100 receives training data 120 and validation data 130 for training a neural network to perform the task. The training data 120 and the validation data 130 each include a plurality of training examples and a respective target output for each of the training examples. Each training example includes respective inputs from two or more of the multiple modalities and the respective target output comprises an associated output to be predicted by the trained neural network based upon inputs from two or more of the multiple modalities of a non-training example during inference (i.e. when the neural network performs the task).

At a high level, the system 100 determines, using the training data 120 and the validation data 130, the optimized neural network architecture 160 for performing the machine learning task by generating multiple candidate neural network architectures 140, determining fitnesses 150 for each of the candidate neural network architectures, and selecting a candidate neural network architecture 140 based on the fitnesses 150.

The measure of fitness 150 can be any measure that is appropriate for the multi-modal task and that measures the performance of a trained neural network on the task. For example, measures of fitness can include various classification errors, intersection-over-union measures, reward or return metrics, and so on.

In particular, the system 100 selects the optimized architecture 160 by jointly optimizing multimodal fusion and model architecture. That is, the system 100 searches both for the operations that are performed by the neural network on a given modality and for how the neural network combines ("fuses") data from different modalities.

More specifically, each candidate architecture 140 that is considered by the system 100, i.e., each candidate architecture in a search space of possible architectures that is searched by the system 100, includes multiple operation blocks that each receive a respective block input and apply one or more operations to the block input to generate an output hidden state. The block input to any given block includes at least a respective first input hidden state and a respective second hidden state.

The system 100 generates a candidate architecture 140 by selecting the connectivity of the operation blocks, i.e., selecting the inputs to each of the operation blocks, and the operations performed by each of the operation blocks. In some implementations, each candidate architecture 140 has other components that are fixed in addition to the operation blocks that have operations that are determined by the system 100. For example, each candidate architecture 140 can include a set of output layers that receive as input the outputs of one or more of the operation blocks and process the input to generate the output of the multi-modal machine learning task.

When generating a given candidate network architecture, the system 100 selects, for each operation block, respective values for each of one or more search fields that define the one or more operations that are applied by the operation block to the block input to the operation block. Thus, by changing the values of the search fields for the multiple blocks, the system 100 can optimize the network architecture.

When generating any given candidate neural network architecture, the system 100 also selects, for each of the operation blocks, which data will be included as the first and second hidden states in the block input that is received by the operation block.

Generally, the system 100 incorporates the multi-modal nature of the data into the architecture search by modifying the way in which the first and second hidden states are selected for the operation blocks.

In particular, the system 100 can effectively make the architecture search multi-modal using one of two techniques: unconstrained input selection or constrained input selection.

In unconstrained input selection, for each operation block, the system 100 selects which data should be the first hidden state and which data should be the second hidden state from a set of possible inputs that includes, for each block, at least each of the respective network inputs from each of the plurality of modalities.

For example, when the training examples each include a first network input from a first modality and a second network input from a second modality, the set of possible inputs separately includes the first network input from the first modality and the second network input from the second modality.

The set of possible inputs also generally includes, for each operation block, the output of the operation blocks that are before the operation block in the architecture.

Thus, the system 100 can separately decide for each modality when the input from that modality is consumed by the neural network, i.e., can optimize how to fuse inputs from different modalities within the same input example.

In constrained input selection, the operation blocks are divided into multiple types: a respective set of modality specific blocks for each of the multiple modalities and a set of fusion operation blocks.

For each modality, the system 100 constrains the modality specific operation blocks for that modality to only receive as input hidden states from the same modality.

For fusion operation blocks, the system 100 allows the fusion operation blocks to receive as input the outputs of any of the modality specific operation blocks for any of the modalities and any fusion operation blocks that are before the fusion operation block in the neural network.

Thus, because the fusion operation blocks can incorporate the modality-specific outputs at any point, the system 100 can learn a separate fusion strategy for each modality.

Generally, the system 100 can use any of a variety of architecture search techniques to select the candidate architectures that are evaluated during the search.

As a specific example, the system 100 can use an evolutionary search technique that maintains a population of candidate architectures. At each iteration of the evolutionary search, the system 100 selects a candidate architecture from the population and generates a new candidate architecture to add to the population by mutating the selected architecture.

Performing this search will be described in more detail below with reference to FIG. 3.

Other examples of architecture search techniques that can be used include random search techniques and reinforcement-learning techniques that use a set of controller parameters to select new architectures and update the controller parameters during the search using reinforcement learning.

To select an optimized architecture after performing the search, the system 100 selects an optimized neural network architecture 160 from the population, i.e., from the candidate architectures 140 that were evaluated during the search, based on the fitnesses 150 of the candidate neural network architectures 140 in the population.

As a particular example, the system 100 can select an optimized architecture 160 by selecting the candidate neural network architecture in the population that has the best fitness.

As another particular example, the system 100 can select, from the population, a plurality of candidate neural network architectures having the highest fitnesses.

The system 100 can then train respective neural networks having each of the plurality of selected candidate neural network architectures, i.e., for more training steps than during the search process or on additional training data, and then determines a respective fitness for each of the trained respective neural networks. The system 100 can then select, as the optimized neural network architecture, the candidate neural network architecture corresponding to the trained respective neural network having the best fitness.

In some implementations, after selecting an optimized architecture, the system 100 trains a neural network having the optimized architecture, e.g., either from scratch or to fine-tune the parameter values generated as a result of determining the optimized architecture for the neural network, and then uses the trained neural network to process requests received by users, e.g., through the API provided by the system. That is, the system 100 uses a neural network having the optimized architecture to perform the multi-modal machine learning task on new examples.

In other implementations, the system 100 can provide the data specifying the optimized architecture and, optionally, the trained parameter values, in response to receiving the training data, e.g., to a user over a data communication network.

Figure 2:
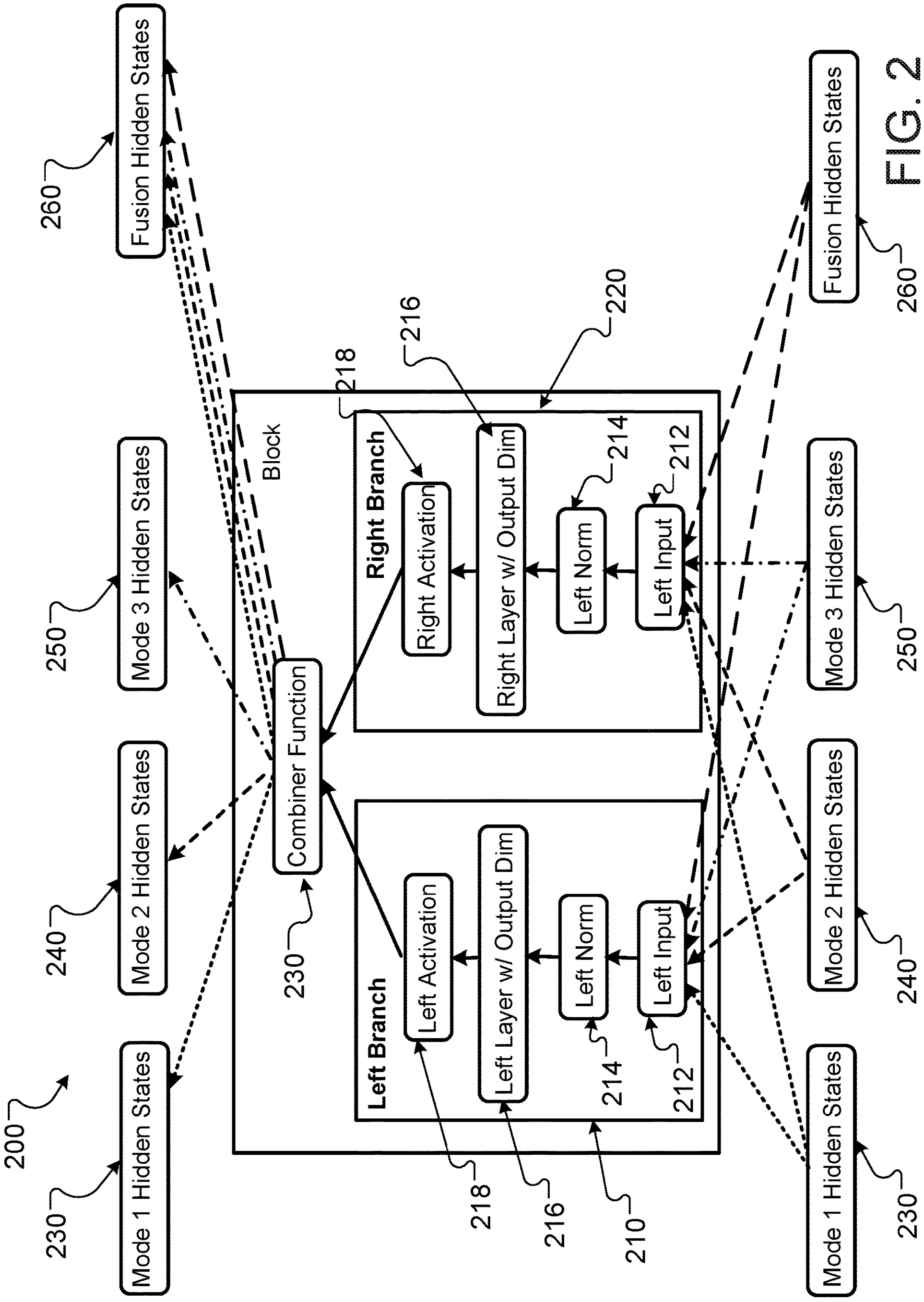
FIG. 2 shows an example architecture of an operation block.

FIG. 2 shows an example architecture for one of the operation blocks 200 in the neural network architecture. In the example of FIG. 2, the neural network is performing a task that requires operating on data of three different modalities: modality 1, modality 2, and modality 3.

Generally, the operation blocks are arranged according to a specified order within the neural network architecture.

In particular, in unconstrained input selection, where there is only a single block type, the operation blocks are arranged in a sequence within the neural network architecture.

In constrained input selection, where there are multiple block types, the order specifies that, for each input modality, the modality specific blocks for that modality are arranged within a respective sequence and the fusion blocks are arranged in a respective sequence.

As shown in FIG. 2, the block 200 includes a left branch 210 that operates on a left input 212, a right branch 220 that operates on a right input 214, and a combiner function 230 that combines the outputs of the left branch 210 and the right branch 220 to generate the output hidden state of the block 200.

Within the left branch 210, a left normalization function 214 is applied on the left input 212, a left layer 216 is applied to the output of the left normalization function 214, and a left activation function 218 is applied to the output of the left layer 216 to generate the output of the left branch.

Within the right branch 220, a right normalization function 224 is applied on the right input 222, a right layer 226 is applied to the output of the right normalization function 224, and a right activation function 228 is applied to the output of the right layer 228 to generate the output of the right branch.

Thus, to generate the architecture of the block 200, the system needs to select the left input 212 and the right input 222, as well as the operations that are performed on the left and right inputs. In particular, the system selects respective values for each of a set of search fields that define the operations that are applied by the operation block 200 to the left input and right input, i.e., to the block input to the operation block.

For example, the system can represent the block 200 as a "gene encoding" as a tuple that includes respective values for each of the following search fields: {left input, left normalization, left layer, left relative output dimension, left activation, right input, right normalization, right layer, right relative output dimension, right activation, combiner function}. To generate a candidate architecture, the system selects values for each of these search fields ("genes") for each of a fixed number of operation blocks within the neural network.

An example architecture vocabulary that shows the search fields and possible values ("vocabularies") that the system can select from for each of the operations in the block 200 is shown below in Table 1.

TABLE 1

| Search Field | Vocabulary |
|---|---|
| Layer | Standard convolution $s \times 1$ for $s \in \{1, 3\}$<br>Depthwise separable convolution (Sifre and Mallat 2014) $s \times 1$ for $s \in \{3, 5, 7, 9, 11\}$<br>Lightweight convolution (Wu et al. 2019) $s \times r$ for $s \in \{3, 5, 7, 15\}$ and reduction factor $r \in \{1, 4, 16\}$<br>n head self attention for n E {4, 8, 16}<br>Gated linear unit (Dauphin et al. 2017)<br>Max pooling $s \times 1$ for $s \in \{3, 5\}$<br>Average pooling $s \times 1$ for $s \in \{3, 5\}$<br>Identity<br>Dead branch |
| Activation | Relu, Leaky relu (Maas, Hannun, and Ng 2013), Swish (Ramachandran, Zoph, and Le 2017; Elfwing, Uchibe, and Doya 2017), None |
| Normalization | Layer normalization, Batch normalization, none |
| Combiner | Addition, Concatenation, Multiplication |

The manner in which the system selects the left input and the right input to the block 200 is different depending on whether the system performs constrained input selection or unconstrained input selection.

In unconstrained input selection, the system selects both the left input and the right input from the same set of possible inputs: the respective network inputs for each of the multiple modalities and the output hidden state of any of the operation blocks that precede the operation block 200 in the sequence.

In constrained input selection, the system selects both the left input and the right input from the same set of possible inputs, but with the set of possible inputs being different depending on the type of the operation block 200.

If the operation block 200 is a modality specific operation block that is specific to a given modality, the system selects the left and right inputs only from the output hidden state of any of the operation blocks that precede the operation block 200 in the sequence of modality specific operation blocks for the given modality. In some implementations, for a given modality, any modality specific operation block for that modality can receive the network input for that modality. In some other implementations, for a given modality, only the first modality specific operation block for the given modality can receive the network input for that modality.

Thus, in the example of FIG. 2, if the operation block 200 is specific to modality 1, the system selects the left and right input only from a set of modality 1 hidden states 230. If the operation block 200 is specific to modality 2, the system selects the left and right input only from a set of modality 2 hidden states 240. If the operation block 200 is specific to modality 3, the system selects the left and right input only from a set of modality 3 hidden states 250.

If the operation block 200 is a fusion operation block, the system selects the left and right inputs from a set of fusion hidden states 260 that includes the output hidden state of (i) any of the modality specific operation blocks for any of the modalities and (ii) any fusion operation blocks that precede the operation block 200 in the sequence of fusion operation blocks. In some implementations, the set of possible inputs to the fusion operation block also includes (iii) the original network inputs for the multiple modalities. Thus, in the example of FIG. 2, if the operation block 200 is a fusion block, the system selects the left and right input from a set of hidden states that includes the output hidden states of (i) any of the modality specific operation blocks for any of the modalities and (ii) any fusion operation blocks that precede the operation block 200 in the sequence of fusion operation blocks and, optionally, (iii) the original network inputs for the multiple modalities.

In unconstrained input selection, once the block 200 generates the output hidden state for the block, the system adds the output hidden state to the set of hidden states that can be used to select the block input for the next block in the sequence of blocks.

In constrained input selection, once the block 200 generates the output hidden state for the block, the system adds output hidden state to the corresponding set(s) 230, 240, 250, and 260. That is, if the operation block 200 is a modality specific operation block that is specific to modality 1, the system adds the output hidden state to the set of modality 1 hidden states 230 and the set of fusion hidden states 260. If the operation block 200 is a modality specific operation block that is specific to modality 2, the system adds the output hidden state to the set of modality 2 hidden states 240 and the set of fusion hidden states 260. If the operation block 200 is a modality specific operation block that is specific to modality 3, the system adds the output hidden state to the set of modality 3 hidden states 250 and the set of fusion hidden states 260. If the operation block 200 is a fusion operation block, the system adds the output hidden state only to the set of fusion hidden states 260.

Once all of the blocks in the architecture have generated output hidden states, the neural network generates the final task output for the multi-modal task from a final output state that is generated from the output hidden state of at least one of the operation blocks. For example, the neural network can process the final output state using one or more neural network layers that are appropriate for the multi-modal task, e.g., one or more linear layers followed by a softmax or regression output layer, to generate the task output.

In unconstrained input selection, the neural network generates the final output state by combining, e.g., concatenating, averaging, or summing, a respective output state for each of the plurality of modalities. As a particular example, the neural network can determine, for each of the modalities, which output hidden states are both (i) not used in a block input for any of the operation blocks and (ii) conditioned on the respective network input from the modality. An output hidden state is conditioned on a given modality if the block input to the operation block was generated using the respective network input from the modality, either directly or indirectly. The system can then, for each modality, combine, e.g., sum or average, the identified output hidden states to generate the respective output state for the modality.

In constrained input selection, the neural network generates the final output state by combining, e.g., concatenating, averaging, or summing, the output hidden states that are not used in a block input for any of the operation blocks, i.e., the output hidden state of the last fusion block in the sequence of fusion blocks and, in some cases, the output hidden state of one or more other operation blocks that are not used as input to any other operation block.

Figure 3:
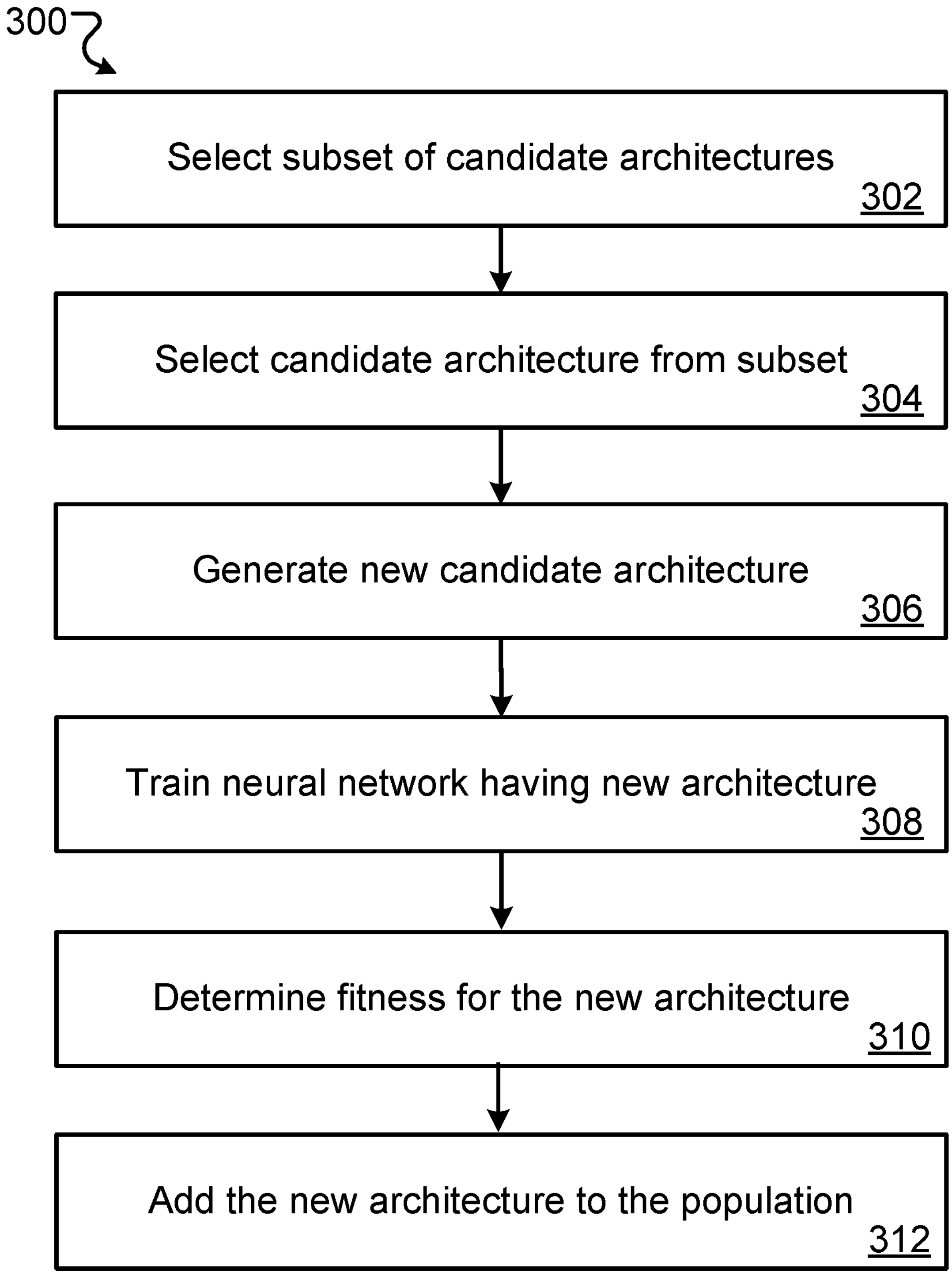
FIG. 3 is a flow diagram of an example process for performing an iteration of an evolutionary search process.

FIG. 3 is a flow diagram of an example process 300 for performing an evolutionary search iteration. For convenience, the process 300 will be described as being performed by a system of one or more computers located in one or more locations. For example, a neural architecture search system, e.g., the neural architecture search system 100 of FIG. 1, appropriately programmed, can perform the process 300.

In general, the system can repeatedly perform the process 300 to determine a final architecture for the neural network that performs the multi-modal task.

To perform the process 300, the system maintains population data that includes, for each candidate neural network architecture in a population of candidate neural network architectures, data defining the candidate neural network architecture and the fitness for the candidate neural network architecture.

More specifically, before the first iteration of the evolutionary search process, the system can generate the population of candidate architectures and, at each iteration of the process 300, can perform the process 300 to generate one or more candidate architectures for the iteration and update the population.

Once termination criteria have been satisfied, e.g., once a threshold number of iterations have been performed, a threshold amount of time has elapsed, an architecture with a threshold fitness has been identified, or some other criterion is satisfied, the system selects an architecture from the population as the optimized architecture as described above.

In some implementations, the system generates the initial population by generating a fixed number of random architectures.

In some other implementations, the system generates the initial population to include one or more variations of a known, well-performing architecture that is part of the search space, e.g., a Transformer-based architecture. As a particular example, the system can generate a fixed number of initial architectures that are each a random mutation of a known Transformer-based architecture.

The system selects a subset of candidate architectures from the candidate architectures that have already been generated (step 302). For example, the system can randomly select a fixed size subset of the candidate architectures that have already been generated. In some cases, the system selects the fixed size subset only from a sliding window of only the most recent portion of the population, i.e., the most recently generated candidate architectures.

The system selects a candidate architecture from the subset of candidate architectures based on the overall fitnesses of the candidate architectures (step 304).

In particular, the system can select the candidate architecture with the best fitness of the candidate architectures in the subset.

The system generates a new candidate architecture from the selected candidate architecture (step 306). In particular, the system can generate the new candidate architecture by mutating the selected candidate architecture. For example, the system can change the values of the search fields of the selected candidate architecture according to a fixed mutation rate. That is, for each search field that defines the selected candidate architecture, the system can determine whether to modify the value of the search field with a fixed probability and, when determining to modify the value, can select another value from the vocabulary for the search field randomly as the new value for the search field.

The system trains, on the training data, a neural network having the new neural network architecture (step 308), e.g., to convergence or for a fixed number of training steps.

The system determines a fitness for the new neural network architecture from a measure of performance of the trained neural network having the new neural network architecture (step 310) on the validation data. For example, the fitness can be the validation accuracy of the trained neural network on the validation data or any other appropriate measure of the performance of a trained neural network, e.g., validation loss, an intersection over union measure, and so on.

The system adds the new neural network architecture and the associated fitness to the population (step 312).

Optionally, at some or all iterations of the process 300, the system can also remove a candidate architecture from consideration, i.e., remove the candidate architecture from the population.

As a particular example, the system can select another plurality of candidate neural network architectures from the population, e.g., by randomly selecting a fixed number of candidates, and remove from the population the candidate neural network architecture from the selected other plurality of candidate neural network architectures that is the oldest, i.e., has a fitness that was determined least recently, or that has the worst fitness.

Figure 4:
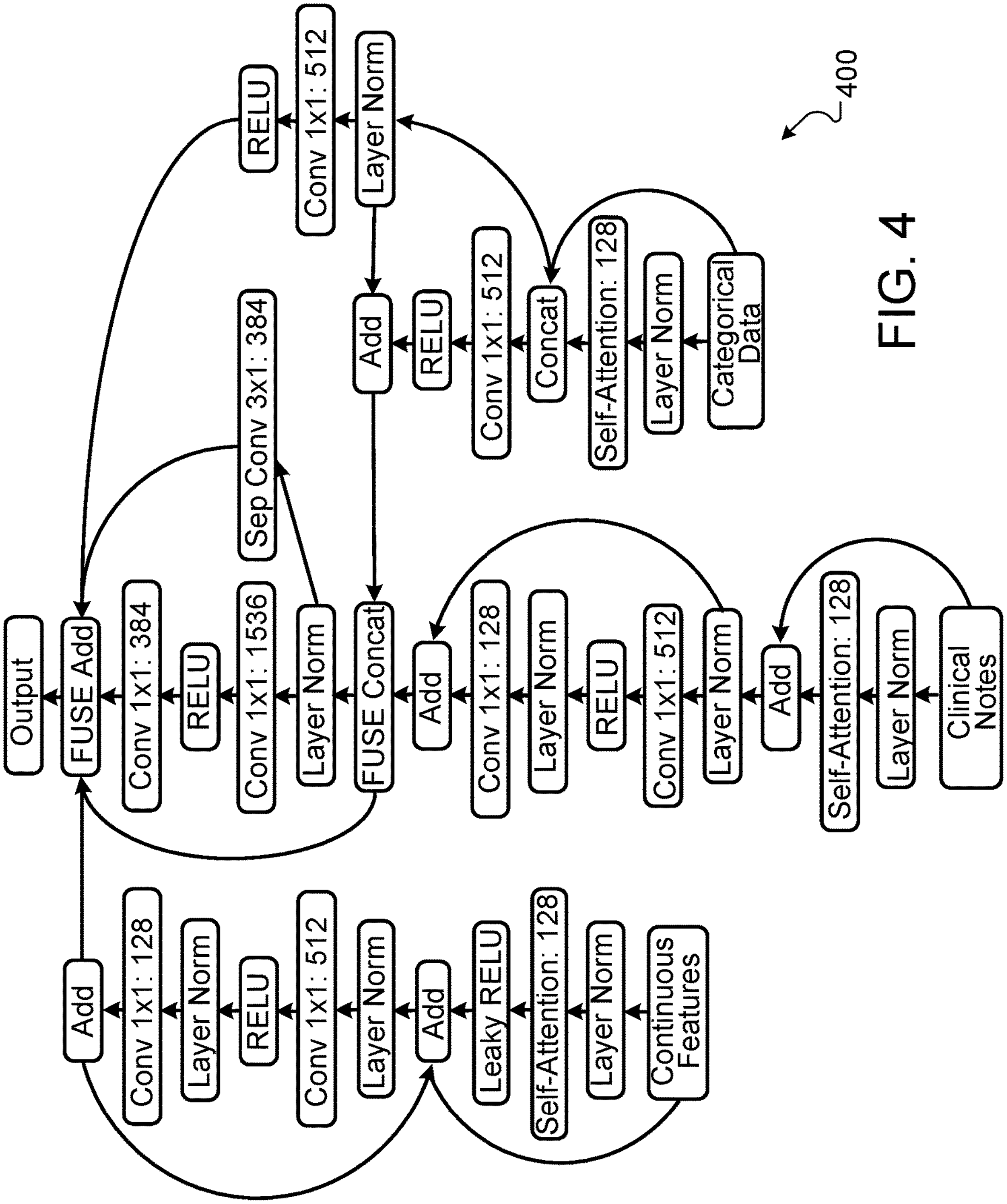
FIG. 4 shows an example architecture that can be selected as the optimized architecture.

FIG. 4 shows an example architecture 400 that can be selected as the optimized architecture. As shown in FIG. 4, the architecture 400 applies different types of fusion for each of modality 1 (continuous features), modality 2 (clinical notes), and modality 3 (categorical data) to generate the final "model output" that is then processed to generate the output for the multi-modal task.

In particular, as can be seen from FIG. 4, the architecture 400 applies unique neural architectures to each data modality.

In addition, the architecture 400 applies different fusion strategies to each modality. For example, the continuous features are processed independently and are only joined with the other modalities at the very end via "late" fusion. The clinical notes, on the other hand, are processed independently at first, but then are joined with categorical data and processed jointly with features derived from the categorical data via "hybrid" fusion. Moreover, the categorical data architecture utilizes both hybrid and late fusion.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving training data for training a neural network to perform a multi-modal machine learning task, the training data comprising a plurality of training examples and a respective target output for each of the training examples, wherein each training example comprises a respective network input from each of a plurality of modalities; and determining, using the training data, an optimized neural network architecture for performing the machine learning task, comprising:

generating a plurality of candidate neural network architectures, wherein:

each candidate neural network architecture comprises a plurality of operation blocks that each receive a respective block input comprising at least a respective first input hidden state and a respective second hidden state and apply one or more operations to the block input to generate an output hidden state, and generating each of the plurality of candidate neural network architectures comprises, for each of the operation blocks in the candidate neural network architecture:

selecting, for each of the plurality of operation blocks, each of the first and second hidden states that are received as input by the operation block from a respective set of possible inputs that includes at least each of the respective network inputs from each of the plurality of modalities, wherein each candidate neural network architecture (i) generates an output state that is a combination of a respective output state for each of the plurality of modalities and (ii) processes at least the output state using one or more neural network layers to generate a final output for the multi-modal machine learning task, and wherein the respective output state for each of the plurality of modalities is generated from output hidden states that are both (i) not used in a block input for any of the plurality of operation blocks and (ii) conditioned on the respective network input from the modality;

determining, for each candidate network architecture, a respective fitness on the multi-modal machine learning task; and selecting, from the candidate neural network architectures, the optimized neural network architecture based on the respective fitnesses.

2. The method of claim 1, wherein the plurality of operation blocks are ordered in a sequence, and wherein, for each of the operation blocks, the respective set of possible inputs includes each of the respective network inputs from each of the plurality of modalities and the block outputs of any of the operation blocks that are before the operation block in the sequence.

3. The method of claim 1, wherein the output state is a concatenation of the respective output states for each of the modalities.

4. The method of claim 1, wherein determining the fitness comprises:

training a new neural network having the candidate neural network architecture on a training subset of the training data; and determining the fitness by evaluating a performance of the trained new neural network on a validation subset of the training data.

5. The method of claim 1, wherein each training example is data from an electronic health record and wherein the plurality of modalities comprise two or more of: contextual features, categorical features, continuous features, or clinical notes.

6. The method of claim 1, wherein each training example is health data for a patient, and wherein the plurality of modalities includes one or more of: data of one or more modalities extracted from an electronic health record for the patient, medical image data for the patient, genomics data for the patient, or waveforms of speech or other audio data relevant to the patient.

7. The method of claim 5, wherein the multi-modal machine learning task is a task to predict an aspect of health of a patient from electronic health record data or health data for the patient.

8. The method of claim 1, wherein the plurality of modalities include audio data and corresponding video data and the multi-modal machine learning task is audio-video speech recognition or visual question-answering.

9. The method of claim 1, wherein the plurality of modalities include content data and one or more of meta data for the content data or history data associated with a user being presented the content data, and wherein the multi-modal machine learning task is content recommendation.

10. The method of claim 1, wherein generating the plurality of candidate neural network architectures comprises:

maintaining population data comprising, for each candidate neural network architecture in a population of candidate neural network architectures, data defining the candidate neural network architecture and the fitness for the candidate neural network architecture, and repeatedly performing the following operations:

selecting a candidate neural network architecture from the population, generating a new candidate neural network architecture by applying one or more mutations to the selected candidate neural network architecture having the best fitness, determining a fitness for the new candidate neural network architecture, and adding the new candidate neural network architecture to the population.

11. The method of claim 10, the following operations further comprising:

selecting another plurality of candidate neural network architectures from the population, and removing from the population the candidate neural network architecture from the selected other plurality of candidate neural network architectures having a fitness that was determined least recently.

12. The method of claim 10, wherein selecting, from the candidate neural network architectures, the optimized neural network architecture based on the respective fitnesses comprises, after repeatedly performing the operations: selecting the optimized neural network architecture from the population based on the fitnesses of the candidate neural network architectures in the population.

13. The method of claim 12, wherein the selecting the optimized neural network architecture comprises selecting the candidate neural network architecture in the population that has the best fitness.

14. The method of claim 12, wherein the selecting comprises:

selecting, from the population, a plurality of candidate neural network architectures having the highest fitnesses;

training respective neural networks having each of the plurality of selected candidate neural network architectures;

determining a respective fitness for each of the trained respective neural networks; and selecting, as the optimized neural network architecture, the candidate neural network architecture corresponding to the trained respective neural network having the best fitness.

15. The method of claim 1, wherein determining, for each candidate network architecture, a respective fitness on the multi-modal machine learning task comprises:

training a neural network having the candidate neural network architecture on at least a portion of the training data; and determining a fitness for the trained neural network based on a fitness measure for the multi-modal machine learning task.

16. The method of claim 1, further comprising:

providing data specifying the optimized architecture for use in performing the multi-modal machine learning task.

17. The method of claim 1, further comprising:

using a neural network having the optimized architecture to perform the multi-modal machine learning task on new examples.

18. The method of claim 1, wherein generating each of the plurality of candidate neural network architectures further comprises, for each of the operation blocks in the candidate neural network architecture:

selecting respective values for each of one or more search fields that define the one or more operations that are applied by the operation block to the block input to the operation block.

19. A system comprising one or more computers and one or more storage devices storing instructions that are operable, when executed by the one or more computers, to cause the one or more computers to perform operations comprising:

receiving training data for training a neural network to perform a multi-modal machine learning task, the training data comprising a plurality of training examples and a respective target output for each of the training examples, wherein each training example comprises a respective network input from each of a plurality of modalities; and determining, using the training data, an optimized neural network architecture for performing the machine learning task, comprising:

generating a plurality of candidate neural network architectures, wherein:

each candidate neural network architecture comprises a plurality of operation blocks that each receive a respective block input comprising at least a respective first input hidden state and a respective second hidden state and apply one or more operations to the block input to generate an output hidden state, and generating each of the plurality of candidate neural network architectures comprises, for each of the operation blocks in the candidate neural network architecture:

selecting, for each of the plurality of operation blocks, each of the first and second hidden states that are received as input by the operation block from a respective set of possible inputs that includes at least each of the respective network inputs from each of the plurality of modalities, wherein each candidate neural network architecture (i) generates an output state that is a combination of a respective output state for each of the plurality of modalities and (ii) processes at least the output state using one or more neural network layers to generate a final output for the multi-modal machine learning task, and wherein the respective output state for each of the plurality of modalities is generated from output hidden states that are both (i) not used in a block input for any of the plurality of operation blocks and (ii) conditioned on the respective network input from the modality;

determining, for each candidate network architecture, a respective fitness on the multi-modal machine learning task; and selecting, from the candidate neural network architectures, the optimized neural network architecture based on the respective fitnesses.

20. One or more non-transitory computer-readable storage media encoded with instructions that, when executed by one or more computers, cause the one or more computers to perform operations comprising:

receiving training data for training a neural network to perform a multi-modal machine learning task, the training data comprising a plurality of training examples and a respective target output for each of the training examples, wherein each training example comprises a respective network input from each of a plurality of modalities; and determining, using the training data, an optimized neural network architecture for performing the machine learning task, comprising:

generating a plurality of candidate neural network architectures, wherein:

each candidate neural network architecture comprises a plurality of operation blocks that each receive a respective block input comprising at least a respective first input hidden state and a respective second hidden state and apply one or more operations to the block input to generate an output hidden state, and generating each of the plurality of candidate neural network architectures comprises, for each of the operation blocks in the candidate neural network architecture:

selecting, for each of the plurality of operation blocks, each of the first and second hidden states that are received as input by the operation block from a respective set of possible inputs that includes at least each of the respective network inputs from each of the plurality of modalities, wherein each candidate neural network architecture (i) generates an output state that is a combination of a respective output state for each of the plurality of modalities and (ii) processes at least the output state using one or more neural network layers to generate a final output for the multi-modal machine learning task, and wherein the respective output state for each of the plurality of modalities is generated from output hidden states that are both (i) not used in a block input for any of the plurality of operation blocks and (ii) conditioned on the respective network input from the modality;

determining, for each candidate network architecture, a respective fitness on the multi-modal machine learning task; and selecting, from the candidate neural network architectures, the optimized neural network architecture based on the respective fitnesses.

21. The system of claim 19, wherein the plurality of operation blocks are ordered in a sequence, and wherein, for each of the operation blocks, the respective set of possible inputs includes each of the respective network inputs from each of the plurality of modalities and the block outputs of any of the operation blocks that are before the operation block in the sequence.

* * * * *